(12) United States Patent
Dimitrov et al.

(10) Patent No.: US 10,823,611 B2
(45) Date of Patent: Nov. 3, 2020

(54) LIGHT SENSING APPARATUS WITH AUTOMATIC GAIN CONTROL

(71) Applicant: BAE Systems Information and Electronic Systems Integration Inc., Nashua, NH (US)

(72) Inventors: Dimitre P. Dimitrov, Wayland, MA (US); Michael J. Choiniere, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 92 days.

(21) Appl. No.: 16/129,461

(22) Filed: Sep. 12, 2018

(65) Prior Publication Data
US 2020/0080889 A1    Mar. 12, 2020

(51) Int. Cl.
*F41G 7/22* (2006.01)
*G01J 1/44* (2006.01)
*G01J 1/08* (2006.01)
*G01J 1/42* (2006.01)

(52) U.S. Cl.
CPC .............. *G01J 1/44* (2013.01); *F41G 7/2246* (2013.01); *F41G 7/2293* (2013.01); *G01J 1/08* (2013.01); *G01J 1/4228* (2013.01); *G01J 2001/444* (2013.01)

(58) Field of Classification Search
CPC . F41G 7/2246; F41G 7/2293; G01J 2001/444
See application file for complete search history.

(56) References Cited

U.S. PATENT DOCUMENTS

2011/0149274 A1*   6/2011   Rissa ...................... G01J 1/18
356/222

* cited by examiner

*Primary Examiner* — Thanh Luu
(74) *Attorney, Agent, or Firm* — Finch & Maloney PLLC; Scott J. Asmus (57) ABSTRACT

A light sensing apparatus includes: an arrangement of light sensing pixels, one or more pixels each associated with a noise floor and able to detect a triggering level of incoming light above the noise floor from a corresponding portion of a scene; readout circuitry to process and reset the triggering pixels; and an automatic gain control (AGC) to raise the noise floor of one or more pixels. Sometimes, the light sensing apparatus is part of a seeker that includes control circuitry to dynamically control the AGC to raise the noise floor of one or more pixels by an adjustable amount that varies in relation to the distance between the seeker and an intended target. Sometimes, the control circuitry dynamically controls the AGC in response to a concurrent triggering of two or more triggering pixels. or in response to a gain schedule corresponding to guiding the seeker to the intended target.

19 Claims, 6 Drawing Sheets

Method of Sensing Light 600

( Start )

↓

Average noise floor over recent period of time for each light sensing pixel
610
— Capacitive Coupling Circuit 530

↓

Detect triggering level of incoming light above noise floor from corresponding portion of scene for at least one pixel
620
— Light Detecting Circuit 505

↓

Asynchronously process and reset the at least one triggering pixel, including assigning time stamp to each triggering pixel
630
— Row and Column Receivers 420, 530

↓

Generate time-stamped event for each triggering pixel
640
— Sequencer and Serializer 440

↓

Artificially raise noise floor of each light sensing pixel by adjustable amount that varies in relation to distance between light sensing pixels and intended target
650
— AGC 300, Event Processor 260

↓

( End )

LIGHT SENSING APPARATUS WITH AUTOMATIC GAIN CONTROL

FIELD OF THE DISCLOSURE

This disclosure relates to a light sensing apparatus with automatic gain control, such as for use with a laser designated sensing system, like a seeker for guiding a smart munition.

BACKGROUND

Light sensing devices sense light of a desired frequency or wavelength range of the electromagnetic spectrum, such as visible and invisible light including ultraviolet (UV) and infrared (IR) light. For example, seekers, such as to guide smart munitions and similar projectiles, can use arrangements of light sensing pixels to detect laser designating signals illuminating a target. However, there are a number of non-trivial issues associated with light sensing devices.

Although the following Detailed Description will proceed with reference being made to illustrative embodiments, many alternatives, modifications, and variations thereof will be apparent to those in light of the present disclosure.

DETAILED DESCRIPTION

A light sensing apparatus with automatic gain control (AGC) is provided. In an embodiment, the light sensing apparatus includes an arrangement of light sensing pixels, such as a square or rectangular array of pixels. Each pixel includes a light detecting sensor to detect a triggering level of incoming light from a corresponding portion of a scene. The incoming light can be visible light, invisible light, or visible and invisible light. The triggering level can be, for example, relative to a given noise floor (e.g., some level above the noise floor). The light sensing apparatus further includes readout circuitry to process and reset the triggering pixels, and an AGC circuit to artificially raise the noise floor of each light sensing pixel, such as by an adjustable or pre-established amount.

The AGC circuit may be implemented in a number of ways. For example, in some such embodiments, the AGC circuit includes a light emitting device, such as an arrangement of one or more light emitting diodes (LEDs) and one or more diffusing optics, to diffuse additional light to the light sensing pixels. In other such embodiments, the AGC circuit includes a current injecting control circuit to control the injecting of current into an output of the light detecting sensor of each light sensing pixel. In any such embodiments, each light sensing pixel may further include a capacitive coupling circuit to average the noise floor over a recent period of time (e.g., a frequency response circuit to cause the pixel to ignore slow changes to the received incoming light). Numerous other embodiments and variations will be apparent in light of the present disclosure.

General Overview

As mentioned above, there are a number of non-trivial issues associated with light sensing devices. Such devices can be used, for instance, in seekers for guiding smart munitions to laser designated (or laser illuminated) targets. To sense faint signals, each light sensor (such as in each pixel of an array of light sensing pixels) in the light sensing device should be sufficiently sensitive to observe the faint signal. However, an incoming strong signal (such as when getting closer to the intended target or other source of particular incoming light) can be reflected to the optics of the pixel array and generate faint ghost images in the other (unintended) pixels. As the ghost signals appear at the same time as the real signal, and with the same pulse pattern as the real signal, they can effectively create numerous ghost laser designation signals that can potentially appear to the guidance system as laser designated (e.g., intended) targets.

Accordingly, in an embodiment of the present disclosure, the sensitivity or gain of the seeker (e.g., the light sensing apparatus of the seeker) is reduced in relation to the distance between the seeker and an intended target. In some embodiments, the sensitivity is lowered through an AGC circuit as the seeker gets closer to the target. In some such embodiments, this takes place in response to numerous triggering pixels or apparent targets being sensed. In some other such embodiments, this takes place according to a schedule (e.g., a predetermined gain schedule) of expected signal strength of the intended target as the seeker approaches the target. By using the AGC circuit to lower the sensitivity over the larger dynamic range of the seeker prior to hitting the target, the seeker only senses the intended target and is inhibited from sensing unintended targets.

In some embodiments, the AGC circuit works by diffusing additional light into the pixel array, such as with one or more LEDs and diffusers. As such, each pixel receives the additional diffused light, and sets a higher noise floor (e.g., a higher average or ambient signal). In some such embodiments, this higher noise floor is set by a pixel analog circuit (e.g., a capacitively coupled or AC coupled circuit, or a frequency response circuit). This effectively makes the pixel blind to faint signals, or to ignore slow changes in the ambient or incoming light, as pixels are not supposed to trigger until the sensed light exceeds a threshold amount (such as a threshold voltage level) over the noise floor, and faint signals are too weak compared to the additional diffused light. In some other embodiments, the AGC circuit works by controlling the injecting of current into the output of each pixel's light detecting sensor (e.g., a photodiode). As with the additional diffused light, the injected current effectively makes the pixel blind to faint signals, since the faint signals (e.g., the currents generated by the faint signals) are too weak compared to the injected current.

In some embodiments, in band energy (e.g., IR laser signals) arrive at a lens and filter optic (e.g., receiving aperture) to focus the radiation of the appropriate wavelength or wavelengths onto a sensor array, such as a light detecting sensor in each pixel of an array of light sensing pixels. Strong signals directed at one sensor (such as a sensor in a light detecting pixel) can create reflections or ghost signals that reach unintended sensors (such as sensors of other light detecting pixels). Accordingly, in some such embodiments, an LED is driven, such as with a diffuser, to direct low-level light over the pixel array, to artificially raise the noise floor at each pixel. The artificial light is sufficient to prevent the reflections or ghost signals from triggering the unintended pixels. By inserting more light, the analog detection circuit noise floor in each pixel raises. The threshold (or triggering level) floats above the noise floor. By raising the noise floor, the ghost reflections (e.g., from strong signals) are no longer detected by the array of pixels.

In some embodiments, the light sensing apparatus with AGC is used in conjunction with other laser designated sensing systems. In some embodiments, the AGC is done within the circuitry of the readout (e.g., with current injection). In some embodiments, current is generated by light sensing pixels, such as proportional to incoming light intensity, and then is converted to a voltage. In addition, a noise floor, such as the recent ambient current level from the light sensor of each pixel, is maintained in each pixel, such as with AC coupling, capacitive coupling, or frequency response. For instance, in some embodiments, the noise floor is measured in each pixel using a capacitor. Further, a threshold voltage is provided to each pixel. When the measured current (as represented by a voltage) exceeds the noise floor (for a particular pixel) by at least the threshold voltage, the pixel triggers an asynchronous event. Row and column circuitry process the event (e.g., generate an event including a time stamp and location of the triggering pixel).

Increasing the noise floor reduces the number of false detections but decreases the sensitivity. In some embodiments, only pixels generating above-average current (relative to their corresponding noise floors) generate events. As such, each pixel works relative to its recent sensings. In some embodiments, the AGC is adjustable (e.g., different brightness levels for the LED, different levels of injected current, or the like). For instance, in some embodiments, when an event processor or other control circuitry detects multiple concurrent pixels triggering, the event processor increases the noise floor (e.g., until only a single pixel triggers, or group of pixels representing the intended target triggers). Likewise, in some such embodiments, when no pixels are triggering, the event processor lowers the noise floor (e.g., until one or more pixels trigger). In some other embodiments, the AGC follows a set or predetermined gain schedule, gradually increasing the noise floor to keep pixels corresponding to the intended target triggering while suppressing other (unintended) pixels from triggering.

Some embodiments are directed to laser detecting seekers, in the visible to mid-IR range. Some embodiments are directed to any light or laser or laser sensing, including UV wavelengths. Some embodiments use an asynchronous laser pulse detector (ALPD). In some embodiments, when a pixel triggers, it generates an event, and readout circuitry processes the event and resets the pixel. In some such embodiments, pixels trigger when they get significantly more radiation than they have been recently receiving. Because of features such as AC coupling or frequency response, in some embodiments, each pixel gets used to (e.g., ignores slow changes to) its recent (ambient or noise) incoming radiation, and triggers when the incoming radiation exceeds this level by a significant amount (as settable by the threshold voltage). In place of current, in some embodiments, pixels sense light through voltage change and integrate the voltages over time to sense the intensity of the light.

According to some embodiments, pixels do not measure current, rather they sense relative change over short periods of time (e.g., triggering levels of voltage based on exceeding the recent noise floor by a threshold amount). In some such embodiments, this threshold can be set (e.g., tuned) to adjust sensitivity/performance. The current-driven pixels change the currents into corresponding voltages. In some embodiments, the LED (or other light source) has different brightness levels, which can be set by control circuitry outside the pixel array (e.g., in the ROIC or outside the ROIC). In some embodiments, the ROIC can detect average brightness, and use that number to set the triggering voltage for all the pixels. In some embodiments, too many pixels triggering at once (e.g., simultaneously or concurrently) is a signal for the control circuitry to use or increase the brightness of the LED to lessen the number of pixels triggering. In some embodiments, the pixel array is a 400×400, 200×200, 100×100, or other square array. In some embodiments, the pixel array is rectangular, circular, ellipsoidal, or other shape. In some embodiments, the pixel array is any shape or size. Numerous other example embodiments and configurations will be apparent in light of this disclosure.

System Architecture

Figure 1:
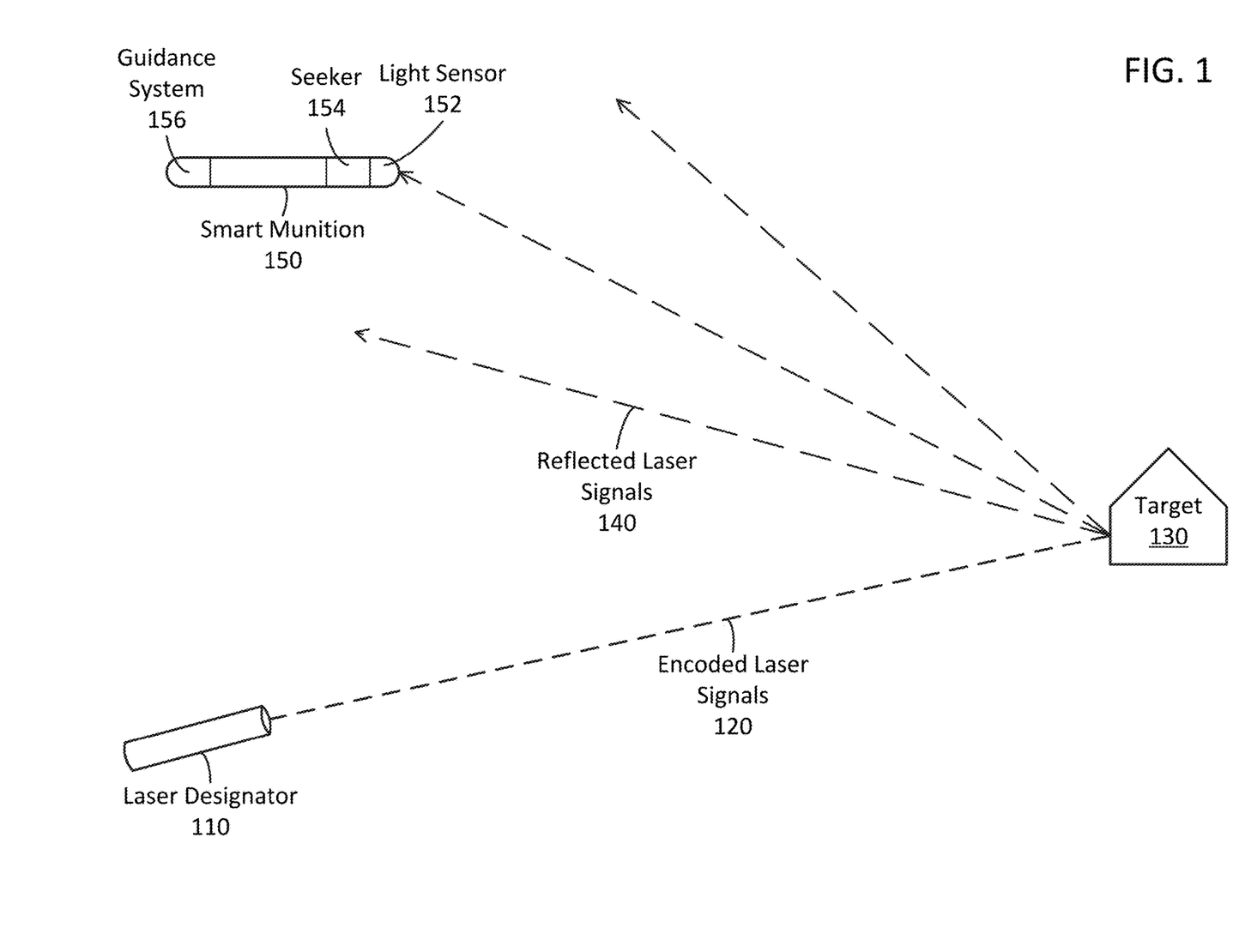
FIG. 1 is a schematic diagram of an example environment for deploying a seeker, including a light sensing apparatus with automatic gain control (AGC), for guiding a smart munition to a target as directed by a laser designator, according to an embodiment of the present disclosure.

FIG. 1 is a schematic diagram of an example environment for deploying a seeker 154, including a light sensing apparatus (or light sensor) 152 with automatic gain control (AGC), for guiding a smart munition 150 to a target 130 as illuminated by a laser designator 110, according to an embodiment of the present disclosure. The laser designator 110, for example, can be a human-deployed instrument, such as a person aiming the laser designator 110 at the target 130, or a vehicle deployed instrument, such as a targeting system from a land vehicle, ship, or aircraft. The laser designator 110, for example, can illuminate or designate the target 130 with an IR laser beam emitting encoded laser signals 120, such as a 1064 nanometer (nm) wavelength laser beam as emitted by a neodymium-doped yttrium aluminum garnet (e.g., $Nd:Y_3Al_5O_{12}$ or Nd:YAG) laser.

The laser beam can encode a signal 120, such as a pulse repetition frequency (PRF) or pulse interval modulation (PIM) encoded signal, that a guidance system 156 (e.g., processor and controls, such as fins, attitude adjusters, and the like) uses to guide the smart munition 150 to the target 130 under the control or assistance of the seeker 154. For example, the guidance system 156 can direct the trajectory of the smart munition 150 to home in on reflected laser signals 140 by adjusting the direction of the munition 150 to center the reflected laser signals 140 to the middle of a sensor pixel array 152 of the seeker 154. By using an encoded signal 120 known only to the guidance system 156 and to the laser designator 110, countermeasures are relatively ineffective against the smart munition 150, and the likelihood of targeting or hitting an unintended target is considerably reduced.

The intended target 130 can be, for example, a vehicle or structure (or another objective to be neutralized by the smart munition 150). By designating the target 130 with the laser designator 110 with an encoded IR laser beam 120, the target 130 may be unaware that the smart munition 150 is specifically targeting (and having an active guidance system assist in delivering the smart munition 150 to) the target 130. The smart munition 150 can be any projectile (e.g., rocket, missile, bomb, shell, to name a few) capable of altering its course after deploying as directed by the guidance system 156 in response to sensing the reflected laser PRF code 140 off the target 130 (for instance, by an IR sensor or sensor array 152 at the front of the smart munition 150).

For example, in one embodiment and deployment environment, the laser designator 110 is configured to deliver a pulsed laser beam of 100 millijoule (mJ) per pulse for a distance of between 1 and 10 kilometers (km), e.g., 5 km, to the target 130. The target is assumed to reflect 10% of the laser beam pulse. The reflected laser beam pulse is then assumed to travel between 2 and 5 km to reach the smart munition 150 and associated IR light sensor 152. If the visibility or atmosphere is assumed to be about 23 km, then approximately 17.8 femtojoule (fJ) of reflected laser energy from the laser pulse reaches the IR sensor 152 when the IR sensor 152 is 5 km away from the target 130. This generates approximately 270 millivolt (mV) of signal at the detector in each pixel of the IR light sensor 152 directed to receive a signal from the target 130. This generated signal can be amplified (for example, three-fold) prior to comparing the signal with a threshold signal level at a comparator in the pixel circuit.

Accordingly, in this embodiment and environment, an example threshold amount of received reflected laser energy can be 0.5 fJ, which results in a 40 mV signal level (preamplified) or 120 mV (amplified) signal level at the comparator. The difference between the 810 mV "normal" signal and the 120 mV threshold signal can account for weaker reflected signals due to various degrading effects such as greater distances (especially of the smart munition 150 to the target 130), less reflectivity of the target 130, worse visibility or atmospheric interference, and the like.

Figure 2:
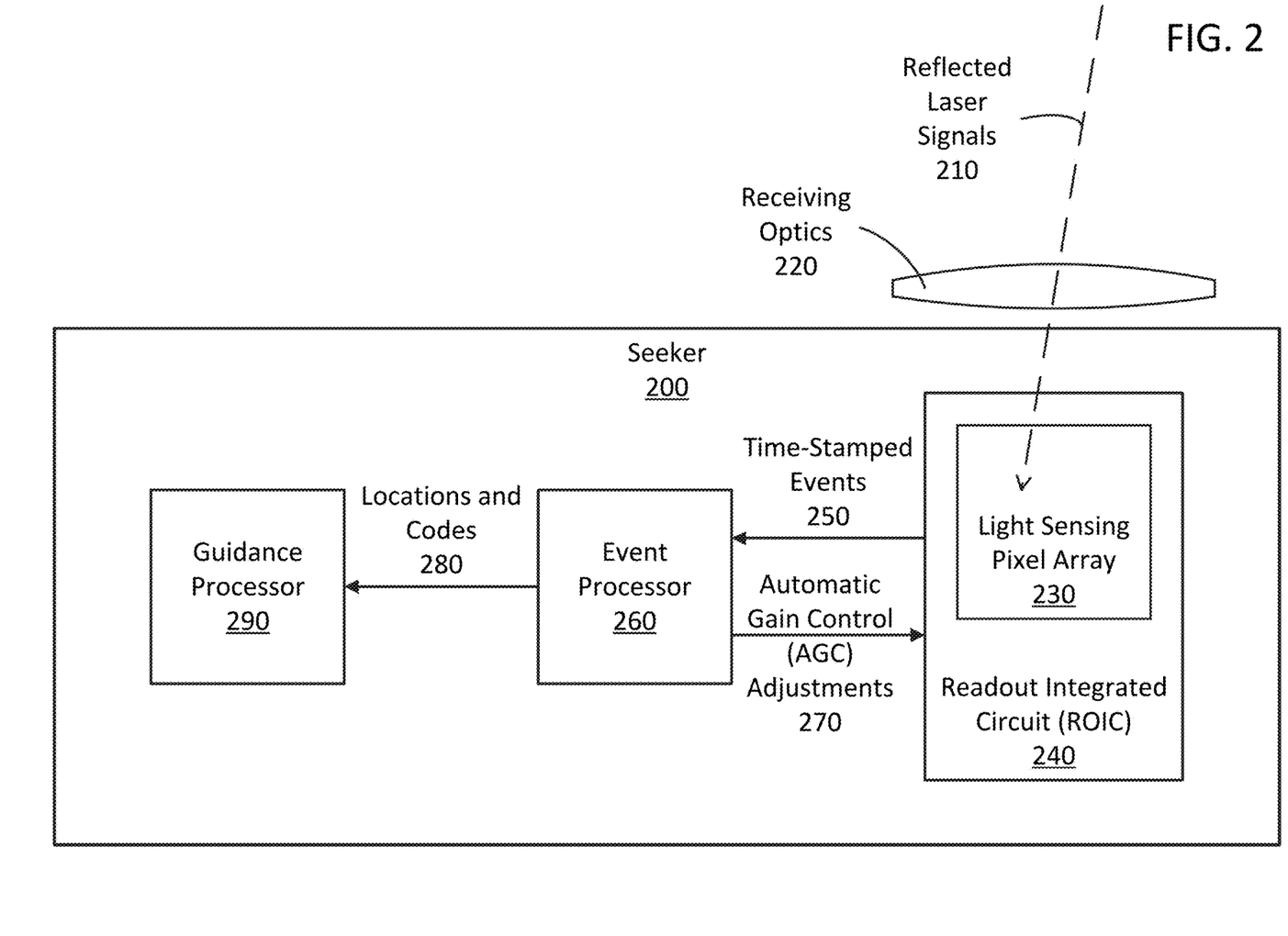
FIG. 2 is a block diagram of an example seeker including a light sensing apparatus with AGC, according to an embodiment of the present disclosure.

FIG. 2 is a block diagram of an example seeker 200 including a light sensing apparatus with AGC, according to an embodiment of the present disclosure. The circuitry of the seeker 200 (including light sensing apparatus with AGC, ROIC, and processing circuits) can be fabricated, for example, as an integrated circuit (IC) using standard IC fabrication techniques such as photolithography. For example, the circuitry can be fabricated in a semiconductor fabrication technology, such as silicon-based or gallium arsenide (GaAs) based complementary metal-oxide semiconductor (CMOS), p-type MOS (PMOS), or n-type MOS (NMOS), to name a few. In addition, the laser optics can use commercially available components such as receiving optics to focus the reflected laser radiation (or other light source) and filter the desired wavelengths on an array of light sensing pixels. The pixels can be arranged, for example, in an array (such as a square array, or a rectangular array, or a circular array, no name a few), like a focal-plane array (FPA) fabricated on silicon-based semiconductor structures configured to sense light. The light can be visible light, invisible light (such as UV light or IR light), or a combination of visible and invisible light. Other semiconductor material systems can be used to implement the pixel array, ROIC, and other circuits, such as group III-V materials (e.g., indium gallium arsenide, or InGaAs-based pixel array).

While circuits are illustrated as being made up of other circuits by function, in other embodiments, two or more circuits may be combined into a single circuit performing the functionality of the two or more circuits. In still other embodiments, a single circuit can be divided into two or more circuits, each performing separate functions performed by the single circuit. As will be further appreciated, a circuit as used herein is a physical structure capable of carrying out one or more functionalities as variously provided herein. For example, the structure of the processing circuits can be hardware such as purpose-built semiconductor (e.g., gate-level logic or application specific integrated circuit (ASIC)) or a printed circuit board (PCB) populated with discrete components configured and arranged to carry out the various functionalities provided herein.

In some embodiments, the circuitry of the seeker 200 (and its components, such as the light sensing apparatus including light sensing pixel array 230 and readout integrated circuit (ROIC) 240) is implemented in hardware or software, such as a custom circuit or a field programmable gate array (FPGA) configured to carry out the function of the circuit. In some embodiments, the circuitry of the seeker 200 is implemented through general-purpose computer hardware configured (e.g., through software, firmware, programmable logic, to name a few) to carry out the tasks assigned to the circuit. Numerous such embodiments and configurations will be appreciated in light of this disclosure.

In the seeker 200, reflected laser signals 210 pass through receiving optics 220 and are sensed by a light sensing pixel array 230, which is part of a readout integrated circuit (ROIC) 240. The receiving optics 220 focus the laser radiation from a scene (e.g., the field of view of the seeker 200) onto the light sensing pixel array 230, such as each pixel corresponding to a different portion of the scene. For example, the sensor pixel array 230 may be a 200×200 pixel array of infrared sensing pixels, each capable of detecting light similar to that of the laser designators (such as a particular wavelength, e.g., 1064 nm), as may be assisted by filters or other optics. In some embodiments, the pixels are capable of sensing other signals (e.g., different wavelengths or strengths of electromagnetic radiation besides laser designator signals). In some embodiments, the pixels are more simplified, being configured to sense a triggering level of electromagnetic radiation (e.g., a subset range of the IR spectrum, such as a particular wavelength of interest) and output a binary state (e.g., triggered or not triggered). In some embodiments, some of the pixels sense the laser designator wavelengths, while other pixels sense different signals.

As the light sensing pixels in the pixel array 230 sense the incoming light, events are generated by the ROIC 240, such as one event per triggering pixel. In one example, the location of the triggering pixel, together with a time stamp corresponding to the triggering, is utilized. These time-stamped events 250 are sent to an event processor 260, which can model the events 250 over time to discern encoded laser signals received by particular pixels or groups of adjacent pixels. The decoded signals (e.g., PRF codes) and their corresponding locations 280 in the pixel array 230 are sent to a guidance processor 290 (or custom processing circuit) for helping guide a corresponding projectile or other munition to an intended (designated) target.

For example, the guidance processor 290 can determine adjustments in the path of the projectile to center the targeted laser spot in the middle of the pixel array 230 (or other appropriate location for delivering the munition to the intended target). It should be noted that the seeker 200 is just an example. For instance, in other embodiments, the guidance processor 290 may be part of an external system, such as a guidance system for a smart munition. In a further example, the pixel array 230 also provides imaging data that can be used with the laser guiding in order to provide a more accurate target acquisition.

In some embodiments, the size of the sensor pixel array 230 is 200×200 pixels. In some other embodiments, the pixel array 230 is larger (such as 250×250) or smaller (such as 150×150). In another embodiment, the pixel array is 100×100. In yet another embodiment, the pixel array is 50×50 (2500 pixels). The shape can be optimized for the intended delivery vehicle (e.g., smart munition) and be, for example, square, round, oval, rectangular, or the like, and the number and arrangement of pixels adjusted accordingly. In still other embodiments, the array can take on different 2-D shapes or patterns, such as a diamond or circle, possibly with different numbers of pixels per row or column (to account for the different shape).

For instance, such shape changes can reduce the total number of pixels by half compared to a square shape (e.g., as few as 1250 pixels). Reducing the pixel count below, say, 1250 pixels, starts diminishing the beneficial effects of the asynchronous event-driven architecture of various embodiments of the present disclosure. The pixels can resolve, for example, in corresponding angular resolutions, with example pixel pitches between 15 and 30 micrometers (μm). In some cases, the shape or pattern of pixels can more appropriately be indexed by each of the two dimensions (rather than strictly rows and columns).

In some embodiments, the event processor 260 sends AGC adjustments 270 to the ROIC 240 and light sensing pixel array 230 to vary the gain adjustment depending on dynamic conditions such as number and locations of pixels concurrently triggering, estimated flight path or distance to the intended target, or the like. The AGC adjustments 270, for example, can raise the noise floor of each pixel when too many pixels are concurrently triggering, or maintain a set or predetermined gain schedule of increases to time, synchronize, or otherwise correspond with the approach of the seeker 200 to the intended target.

Figure 3:
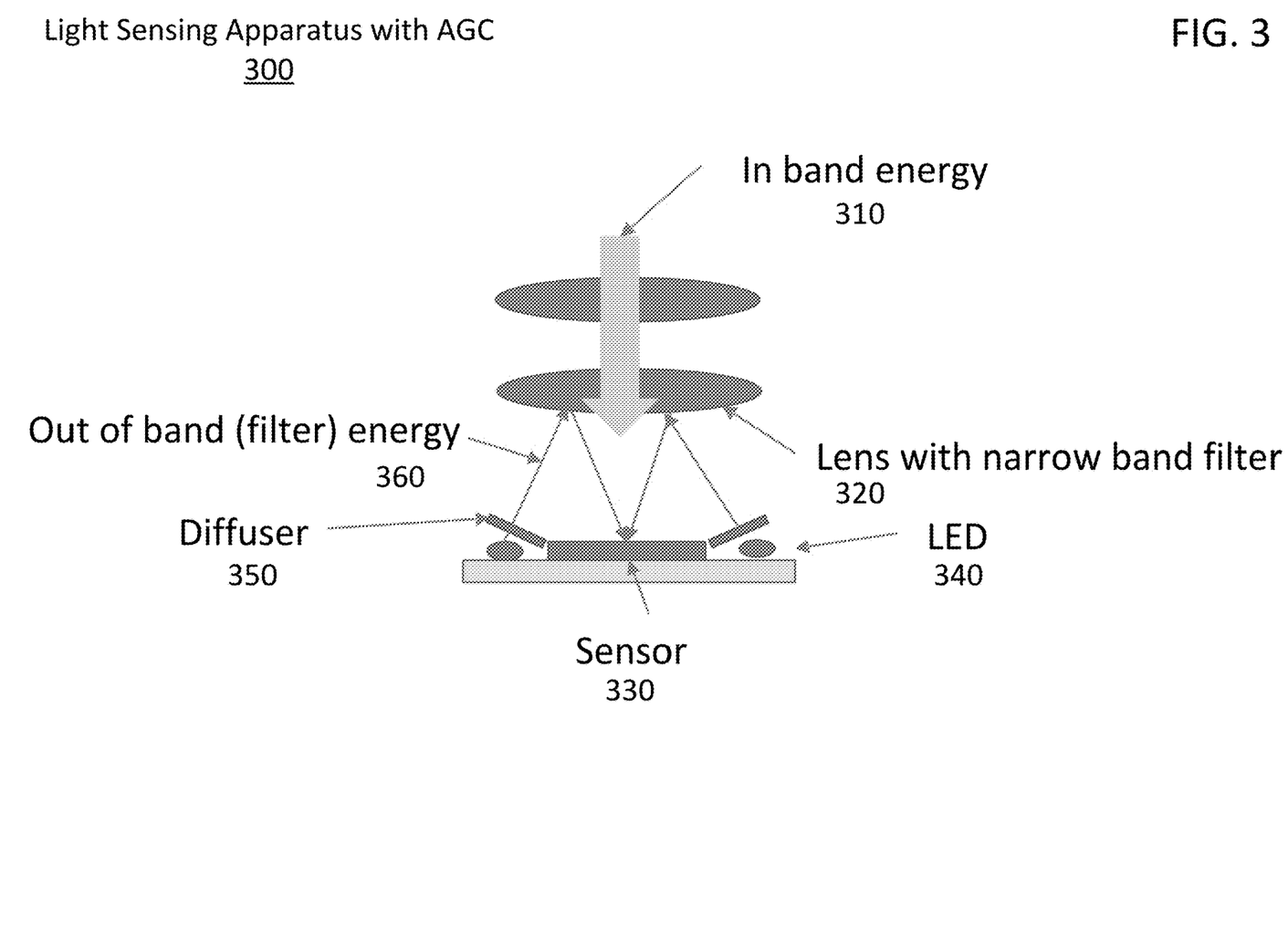
FIG. 3 is a cross-sectional view of an example light sensing apparatus with AGC, according to an embodiment of the present disclosure.

FIG. 3 is a cross-sectional view of an example light sensing apparatus 300 with AGC, according to an embodiment of the present disclosure. The light sensing apparatus 300 includes lens 320 with narrow band filter to focus in band energy 310 towards a corresponding sensor 330 (such as a light detecting sensor of one pixel of many pixels) for sensing light and filter out of band energy to which the sensor 330 is sensitive. As part of the AGC, adjustable LED 340 and diffuser 350 emit diffused light (including some out of band energy 360 to which the sensor 330 is sensitive) towards the lens 320 (with narrow band filter) from below. A portion of the out of band energy 360 reflects off the lens 320 and is directed to the pixel array, including sensor 330. This raises the noise floor of the sensor 330, which makes the sensor 330 less sensitive to faint signals, such as ghost signals reflecting off other sensors. Numerous LEDs 340 and diffusers 350 can be used, and the LEDs can be controlled by a processing circuit (such as an outside processor or microprocessor) to adjust the amount of light used to lessen the sensitivity (e.g., reduce the gain) of the sensor 330 and other sensors.

When the LEDs 340 are tuned on or their brightness is increased, control circuitry can be used to prevent or ignore the subsequent triggering of the sensors 330 from the artificial light. For example, in some embodiments, the sensors 330 are reset after the LEDs 340 increase their brightness. In some other embodiments, the triggering voltage level is temporarily increased with the LED brightness increase, to prevent the sensors 330 from triggering. In still some other embodiments, the LED brightness increase is gradual, so the noise floor increase of the sensors 330 keeps pace with the additional light and the sensors 330 do not trigger. In still some other embodiments, all or most of the sensors 330 trigger after the LED brightness increase, but the control circuitry ignores the triggering sensors 330 for a brief period (e.g., until the noise floor of each sensor 330 adjusts to the increased LED brightness). Other techniques can also be employed to address the increased LED brightness from causing a large number of sensors 330 to inadvertently trigger, as would be apparent in light of this disclosure.

Figure 4:
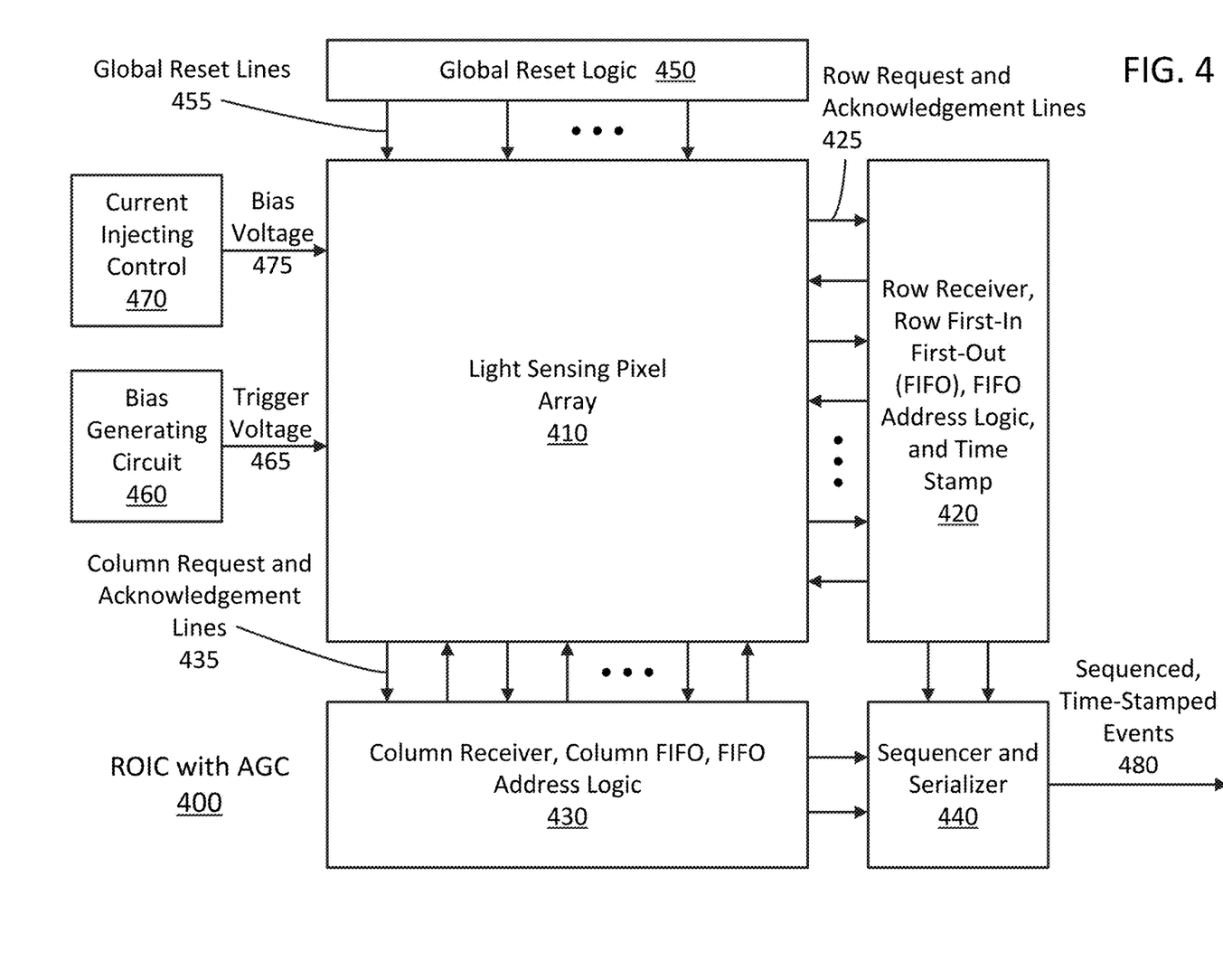
FIG. 4 is a block diagram of an example readout integrated circuit (ROIC) with AGC, according to an embodiment of the present disclosure.

FIG. 4 is a block diagram of an example readout integrated circuit (ROIC) 400 with AGC, according to an embodiment of the present disclosure. The ROIC 400 includes a light sensing pixel array 410, a row receiver circuit 420 (including row first-in first-out (FIFO), FIFO address logic, and time stamp), a column receiver circuit 430 (including column FIFO and FIFO address logic), a sequencer and serializer circuit 440, and a global reset logic circuit 450. The pixels in the pixel array 410 can be, for example, simple threshold-detecting pixels, sensing portions of the light spectrum used by laser designators. In other embodiments, the pixels may sense different spectrums (such as microwave spectrums). The pixels can be arranged in rows and columns, and communicate via corresponding row request and acknowledgement lines 425 and column request and acknowledgement lines 435. For example, the pixels are arranged in rows by the row request and acknowledgement lines 425, and in columns by the column request and acknowledgement lines 435, with one row request line and one row acknowledgement line per row of pixels, and one column request line and one column acknowledgement line per column of pixels.

Each pixel is uniquely addressed by a corresponding pair of row request and column request lines as well as a corresponding pair of row acknowledgement and column acknowledgement lines. Each of the row request and row acknowledgement lines is commonly coupled to the pixels in the corresponding row, while each of the column request and column acknowledgement lines is commonly coupled to the pixels in the corresponding column. The pixels can be concurrently (e.g., simultaneously) reset through the global reset logic circuit 450, which can send a global reset command to the pixels through global reset lines 455 (e.g., each commonly coupled to all the pixels in the same column). The row request line can be for sending a row request to the row receiver 420, while the row acknowledgement line can be for receiving a row acknowledgement from the row receiver 420. Likewise, the column request line can be for sending a column request to the column receiver 430, while the column acknowledgement line can be for receiving a column acknowledgement from the column receiver 420.

The ROIC 400 further has a bias generation circuit 460 for generating trigger voltage 465 (e.g., calibrating voltage for setting how much light a pixel should sense over its noise floor before triggering). In addition, the ROIC 400 includes current injecting control (or current injecting control circuit) 470 for controlling the injecting of current (e.g., through bias voltage 475, that can be converted to current, for example, through a transistor) into an output of the light sensor of each pixel as part of the AGC. The current injecting control 470, for example, can work in addition to or in place of the LED 340 and diffuser 350 (or other AGC approach) of FIG. 3. In some embodiments, the current injecting control circuit 470 controls how much current to inject into each pixel. Current injection is similar to the LED technique discussed above in terms of its effect on each pixel (e.g., to artificially raise the noise floor in each pixel), so similar approaches can be used as discussed above regarding when and how much to use it, what to do about inadvertently triggering pixels, and similar concerns. Other AGC techniques can also be used, in place of or in addition to the current injection, as would be apparent in light of the present disclosure.

In one or more embodiments, the pixels have light sensors for sensing triggering amounts of optical radiation, such as reflected IR, visible, and UV radiation from laser designators. For example, the pixels can be customized to sense only specific frequencies or wavelengths, such as 1064 nm infrared light emitted by Nd:YAG laser designators. When a sufficient level of radiation is incident upon a pixel of the array (e.g., as determined by a threshold amount over a noise floor), a pixel triggers, and it sends row and/or column requests through its corresponding row request and/or column request lines, which are received by the row receiver 420 and/or column receiver 430, respectively. It is possible that neighboring pixels (e.g., up to a 2×2 region) may trigger because of the same reflected laser signals from the same target.

Triggering pixels for the same signals reflecting off the same target may also vary with time to account for movement of the seeker, the laser designator, or possibly the target, among other reasons (such as multiple designators designating the same target). In one or more embodiments, follow-on event processing handles the tracking of the same laser designating signals moving (slowly) across the pixel array 410 (e.g., between adjacent pixels or in close proximity) during such events.

In some embodiments, the row request is sent first. The order can vary; in some other embodiments, the column request is sent first or both requests are sent concurrently. The row receiver 420 processes the row requests as they are received. For example, the row receiver 420 can monitor the separate row request lines 425, and process one of the rows when a row request is received from the corresponding row request line using FIFO logic. In some embodiments, the row receiver 420 scans the row request lines in round robin fashion, processing the next row that sends a row request. In this manner, the row receiver 420 does not favor one row over another, and processes each row's requests with good temporal correlation. In some embodiments, the row receiver 420 assigns a time stamp to the received row request, such as for generating events from triggering pixels in the corresponding row.

Continuing, the row receiver 420 sends a row acknowledgement through the corresponding row acknowledgement line to the received row request. This is received by every pixel in the corresponding row. The row receiver 420 also sends the row address and time stamp to the sequencer 440, which processes events for all the triggering pixels in the same row with the same time stamp. It should be noted that time stamping can be done in numerous places in the triggering pixel processing in place of the row receiver 420, such as with the column receiver 430, the sequencer 440, or other circuits. In some embodiments, time stamping is saved until event processing (e.g., off-chip from the ROIC 400). However, this introduces some delay between receipt of the triggering event and the eventual time-stamping of the corresponding events. Time stamping is useful, for example, in determining any laser signal codes being used.

At this point, every triggering pixel in the same row that receives the acknowledgement sends their column requests through their corresponding column request lines 435. The column receiver 430 receives these column requests (e.g., using FIFO logic, such as by scanning all the column request lines), sending acknowledgements to each of the columns that sent column requests through their corresponding column acknowledgement lines as well as sending the corresponding column addresses to the sequencer 440. The sequencer 440 combines the current row address and time stamp sent by the row receiver 420 with each of the different column addresses from the column receiver 430 and generates a time-stamped event 480 for each of the different column addresses (and that all share the same row address). When the triggering pixels in the row receive the corresponding column acknowledgements, they reset their sensors and are ready to be triggered again. This clears all the row and column requests from these triggering pixels as well. Processing then resumes with the row receiver 420 scanning for another row that sent a row request.

Because of the row request and column request lines, the ROIC 400 can avoid scanning every pixel; rather, the ROIC 400 can process the triggering pixel requests asynchronously, such as by scanning entire rows at a time, looking for a row request (that can represent one or more pixels triggering in the corresponding row). This generates the next row address (and time stamp) for the sequencer 440, which combines the row address with the corresponding column addresses for the triggering pixels in that row and generates a separate time-stamped event 480 for each one. In some embodiments, the sequencer 440 serializes these events 480 and sends them to an event processor (e.g., off chip) to decode patterns of the received laser (or other light) signals over time and their corresponding locations in the pixel array 410. The event processor can send these decoded patterns and their locations to a guidance system to control the munition or other payload to its intended target.

For various purposes, such as initializing the pixel array 410, clearing an abnormal condition, or the like, the global reset logic 450 is provided, together with corresponding global reset lines 455. Each global reset line 455 can, for example, reset every pixel in a corresponding column. In another embodiment, the global reset lines 455 are arranged by row. The global resetting can be similar to the local resetting that takes place in each pixel when its corresponding row and column acknowledgements are received.

Figure 5:
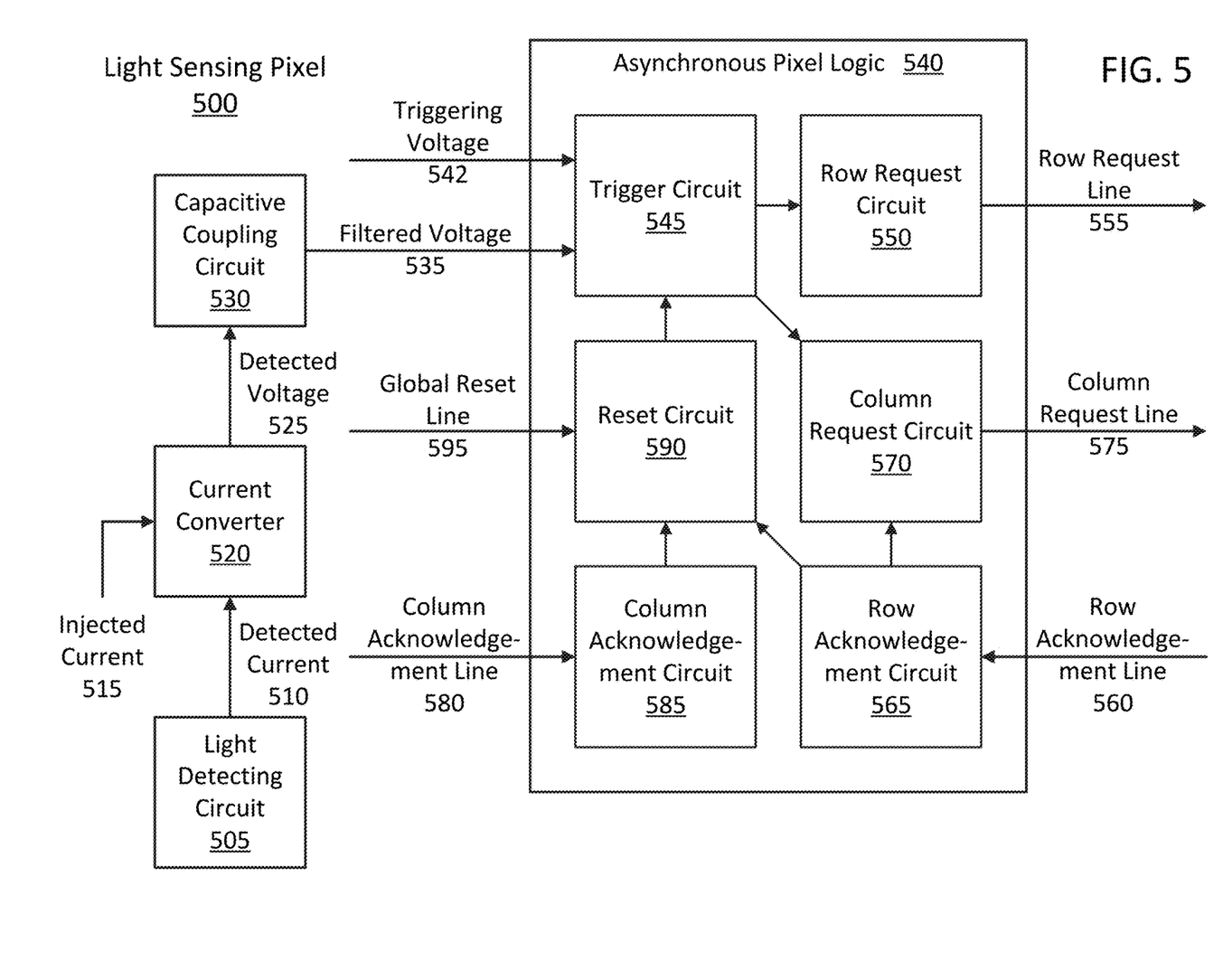
FIG. 5 is a block diagram of an example light sensing pixel, such as for use with a light sensing pixel array in the ROIC of FIG. 4, according to an embodiment of the present disclosure.

FIG. 5 is a block diagram of an example light sensing pixel 500, such as for use in the light sensing pixel array 410 in the ROIC 400 of FIG. 4, according to an embodiment of the present disclosure. The sensing pixel 500 includes a light detecting circuit 505, a current converter 520, a capacitive coupling circuit 530, and an asynchronous pixel logic circuit 540. The light detecting circuit 505 can be, for example, an open circuit photo-diode, which detects light as currents (e.g., detected current 510). The detected current 510 from the light detecting circuit 505 is input to the current converter 520, which also inputs any injected current 515 (such as for use as AGC) and converts the combined current into a detected voltage 525. The detected voltage 525 is passed to the capacitive coupling circuit 530, which uses, for example, AC coupling techniques such as with a capacitor to establish a recent noise floor, passing any difference in the detected voltage 525 over the noise floor as filtered voltage 535 to trigger circuit 545 (part of the asynchronous pixel logic 540).

The asynchronous pixel logic circuit 540 includes a trigger circuit 545, a row request circuit 550, a row acknowledgement circuit 565, a column request circuit 570, a column acknowledgement circuit 585, and a reset circuit 590. In some embodiments, the trigger circuit 545 includes a comparator that compares the filtered voltage 535 from the capacitive coupling circuit 530 with a triggering voltage 542 (e.g., a tunable voltage that can be calibrated to optimize seeker performance, such as in the particular application or environment in which it is being used). In one example, the triggering voltage 542 is set to the difference above the noise floor of the pixel so that filtered voltages exceeding the triggering voltage 542 are likely resulting from reflected laser signals (such as from a laser designator). According to some embodiments, the triggering voltage 542 is dynamic and can be adjusted by an operator or by the internal processing to keep the light sensing pixel 500 working as intended.

When the comparator determines that the filtered voltage 535 exceeds the triggering voltage 542, the pixel 500 triggers (e.g., goes from a reset state to a triggered state). Once in the triggered state, the trigger circuit 545 lets the row request circuit 550 and the column request circuit 570 know that the pixel 500 has triggered. In response, the row request circuit 550 sends a row request along the row request line 555 (which, for example, joins the request with any other row requests from pixels in the same row). For instance, the row request line 555 can be a simple on/off state (on for one or more pixels in the row have triggered, off for none of the pixels in the row have triggered).

After sending the row request along the row request line 555, the pixel 500 waits for a row acknowledgement along the row acknowledgement line 560. When the row acknowledgement is received by the row acknowledgement circuit 565, the row acknowledgement circuit 565 informs the reset circuit 590 (that the row request can be reset) and the column request circuit 570 to send the column request. In combination with the request from the trigger circuit 545, the column request circuit 570 responds by sending the column request along the column request line 575. The pixel 500 waits for a column acknowledgement along a column acknowledgement line 580. When the column acknowledgement is received by the column acknowledgement circuit 585, the column acknowledgement circuit 585 informs the reset circuit 590 that the column request can be reset.

In response to the row acknowledgement circuit 565 and the column acknowledgement circuit 585 informing the reset circuit 590 of the row acknowledgement and column acknowledgement, respectively, the reset circuit 590 resets the pixel 500 (e.g., takes the pixel 500 from the triggered state to the reset state). In some embodiments, the reset circuit 590 notifies the trigger circuit 545 to reset the sensor and other circuitry that has triggered. In some embodiments, the reset circuit 590 resets the row request and the column request on the row request line 555 and the column request line 575, respectively. In addition, a global reset line 595 is connected to the reset circuit 590. When the reset circuit 590 receives a global reset along the global reset line 595, the pixel resets in much the same manner as receiving both a row acknowledgement and a column acknowledgement. The global reset line 595 thus provides an efficient mechanism to reset all the pixels concurrently regardless of what states they happen to be in.

Numerous other embodiments and system configurations will be apparent in light of this disclosure.

Methodology

Figure 6:
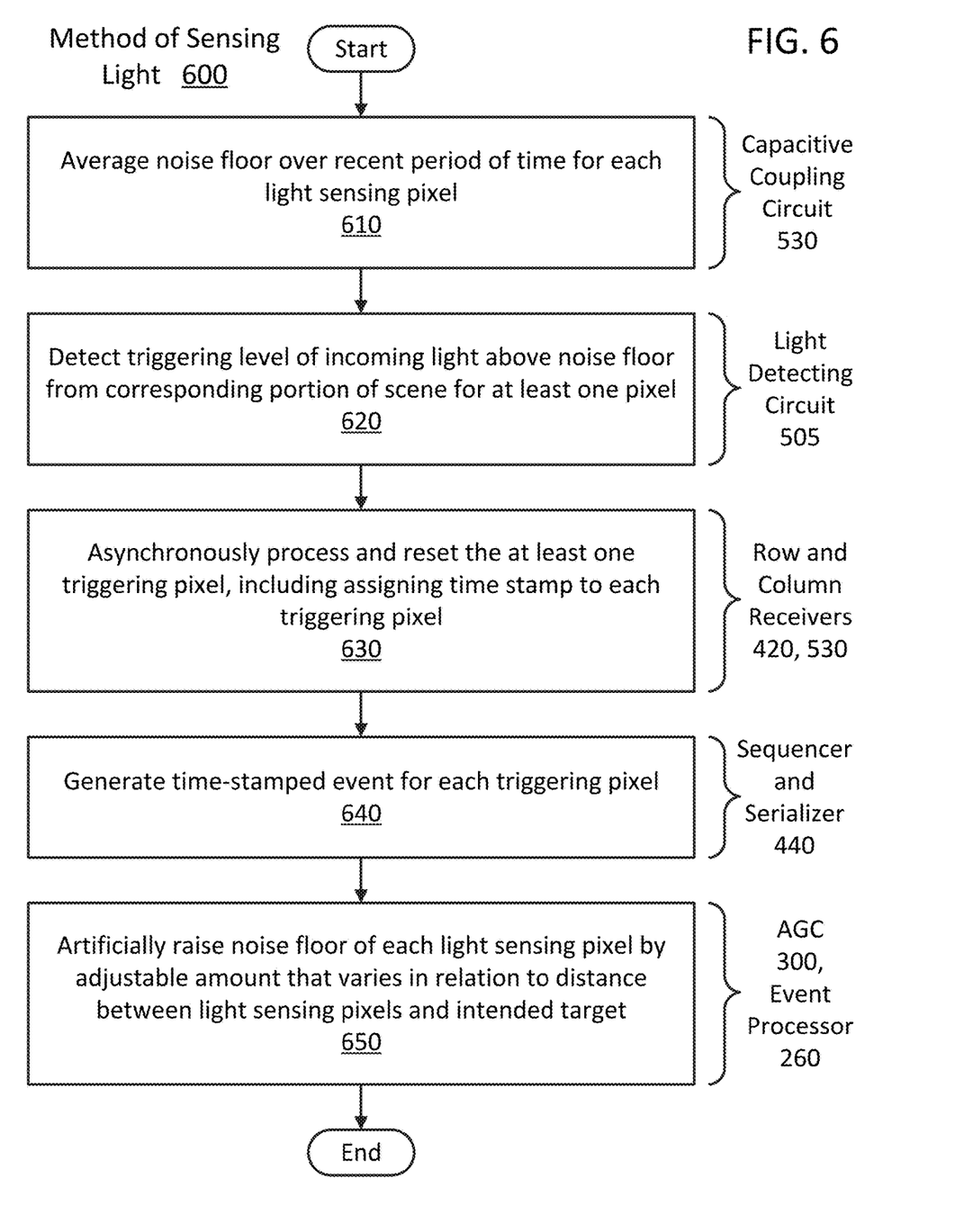
FIG. 6 is a flow diagram of an example method of sensing light, according to an embodiment of the present disclosure.

FIG. 6 is a flow diagram of an example method 600 of sensing light, according to an embodiment of the present disclosure. The method 600 and other methods described herein may be implemented in hardware or combinations of hardware and software. For example, the method 600 may be implemented by the light sensing apparatus (with AGC) components and techniques of FIGS. 1-5. Throughout the description of the method 600, references may be made to example corresponding components or aspects of FIGS. 1-5. In another embodiment, the method 600 may be implemented by a custom circuit such as a ROIC with custom processing circuits (such as an FPGA) and optics configured to carry out the method 600. In other embodiments, the method 600 may be performed in conjunction with a special purpose processor, such as a signal processor.

In some other embodiments, parts of the method 600 may be implemented as a series of computer instructions, such as software, firmware, or a combination of the two, together with one or more computer processors (e.g., one or more microprocessors). The instructions, when executed on a given processor, cause portions of the method 600 to be performed. For example, in one or more embodiments, a computer program product is provided. The computer program product includes one or more non-transitory machine-readable mediums (such as a compact disc, a DVD, a solid-state drive, a hard drive, RAM, ROM, on-chip processor cache, or the like) encoded with instructions that when executed by one or more processors cause portions of the method 600 (or other method described herein) to be carried out for light sensing with AGC. In addition, while the methods described herein may appear to have a certain order to their operations, other embodiments may not be so limited. Accordingly, the order of the operations can be varied between embodiments, as would be apparent in light of this disclosure.

In a similar light, the components in FIGS. 1-5 and other circuits disclosed herein may be custom hardware circuits or general-purpose computer hardware configured (e.g., through software, firmware, programmable logic, to name a few) to carry out the tasks assigned to the circuit. While circuits are illustrated as being made up of other circuits by function, in other embodiments, two or more circuits may be combined into a single circuit performing the functionality of the two or more circuits. In still other embodiments, a single circuit can be divided into two or more circuits, each performing separate functions performed by the single circuit.

Returning to FIG. 6, in the method 600, incoming light (such as reflected laser signals 140 and 210) are sensed an arrangement (such as a 200×200 square array) of light sensing pixels (such as light sensing pixel array 230 and 410, and light sensing pixel 500). Each light sensing pixel includes a light detecting sensor (such as sensor 330 and light detecting circuit 505) to detect a triggering level of the incoming light above a noise floor from a corresponding portion of a scene. The incoming light can include visible light, invisible light, or visible and invisible light.

In the method 600, processing commences with averaging 610, by a capacitive coupling circuit (such as capacitive coupling circuit 530) of each light sensing pixel, the noise floor over a recent period of time. The method 600 further includes detecting 620, by the light detecting sensor of each of at least one light sensing pixel, the triggering level of the incoming light above the noise floor from the corresponding portion of the scene. The method 600 further includes asynchronously processing 630 and resetting, by readout circuitry (such as the row receiver 420 and column receiver 430), the at least one triggering pixel. The method 600 further includes generating 640 a time-stamped event (such as time-stamped events 250 and 480) by event processing circuitry (such as sequencer and serializer 440). The method 600 further includes artificially raising 650, by an automatic gain control (AGC, such as AGC 300 or current injection control 470 using event processor 260), the noise floor of each light sensing pixel by an adjustable amount (e.g., that varies in relation to the distance between the light sensing pixels and an intended target).

For example, in some embodiments, the AGC includes diffusing, by a light emitting device (such as LED 340 using diffuser 350), additional light to the light sensing pixels. For another example, in some other embodiments, the AGC includes controlling, by a current injecting control circuit (such as current injecting control 470 using bias voltage 475), the injecting of current (such as injected current 515) into an output of the light detecting sensor of each light sensing pixel. In some embodiments, artificially raising the noise floor includes artificially raising the noise floor of each light sensing pixel by an adjustable amount (such as in response to numerous concurrent triggering pixels, or according to a set or predetermined gain schedule). Numerous other techniques and methods will be apparent in light of this disclosure.

Further Example Embodiments

The following examples pertain to further embodiments, from which numerous permutations and configurations will be apparent.

Example 1 is a light sensing apparatus including: an arrangement of light sensing pixels, one or more said pixels each associated with a noise floor and able to detect a triggering level of incoming light above the noise floor from a corresponding portion of a scene, the incoming light including visible light, invisible light, or visible and invisible light; readout circuitry to receive output signals from the triggering pixels and to reset the triggering pixels; and an automatic gain control (AGC) circuit to raise the noise floor of one or more of the one or more pixels.

Example 2 includes the light sensing apparatus of Example 1, wherein the AGC circuit includes a light emitting device to diffuse additional light to the one or more of the one or more pixels.

Example 3 includes the light sensing apparatus of Example 2, wherein the light emitting device includes at least one light emitting diode (LED) and at least one diffuser.

Example 4 includes the light sensing apparatus of Example 1, wherein the AGC circuit includes a current injecting control circuit to control injecting of current into an output of a light detecting sensor of each of the one or more of the one or more pixels.

Example 5 includes the light sensing apparatus of Example 1, wherein each of the one or more pixels further includes a capacitive coupling circuit to average the noise floor over a recent period of time.

Example 6 includes the light sensing apparatus of Example 1, wherein the arrangement of light sensing pixels is an array of rows and columns, and the readout circuitry includes row circuitry coupled to the rows and column circuitry coupled to the columns to asynchronously process one or more said triggering pixels each further including request circuitry to notify the row circuitry, the column circuitry, or both the row circuitry and the column circuitry of its triggering.

Example 7 includes the light sensing apparatus of Example 1, wherein the readout circuitry is further to assign a time stamp to each triggering pixel.

Example 8 includes the light sensing apparatus of Example 1, wherein the AGC circuit is further to raise the noise floor of the one or more of the one or more pixels by an adjustable amount.

Example 9 includes the light sensing apparatus of Example 1, wherein the AGC circuit is further to raise the noise floor of the one or more of the one or more pixels in response to a concurrent triggering of two or more said triggering pixels.

Example 10 includes the light sensing apparatus of Example 1, further including bias circuitry to adjust the triggering level of the one or more pixels.

Example 11 is a method of sensing incoming light by an arrangement of light sensing pixels, one or more said pixels each associated with a noise floor and able to detect a triggering level of the incoming light above the noise floor from a corresponding portion of a scene, the method including: detecting, by a light detecting sensor of at least one of the one or more pixels, the triggering level of the incoming light above the noise floor from the corresponding portion of the scene, the incoming light including visible light, invisible light, or visible and invisible light; processing and resetting, by readout circuitry, the at least one triggering pixel; and artificially raising, by an automatic gain control (AGC), the noise floor of one or more of the one or more pixels.

Example 12 includes the method of Example 11, wherein artificially raising the noise floor includes diffusing, by a light emitting device, additional light to the one or more of the one or more pixels.

Example 13 includes the method of Example 11, wherein artificially raising the noise floor includes controlling, by a current injecting control circuit, injecting of current into an output of a light detecting sensor of the one or more of the one or more pixels.

Example 14 includes the method of Example 11, further including averaging, by a capacitive coupling circuit of each of the one or more pixels, the noise floor over a recent period of time.

Example 15 includes the method of Example 11, wherein the arrangement of light sensing pixels is an array of rows and columns, the readout circuitry includes row circuitry coupled to the rows and column circuitry coupled to the columns, and the method further includes: asynchronously processing, by the readout circuitry, the at least one triggering pixel; and notifying, by request circuitry of each triggering pixel, the row circuitry, the column circuitry, or both the row circuitry and the column circuitry of its triggering.

Example 16 includes the method of Example 11, further including assigning, by the readout circuitry, a time stamp to each triggering pixel.

Example 17 includes the method of Example 11, wherein artificially raising the noise floor includes artificially raising the noise floor of the one or more of the one or more pixels by an adjustable amount.

Example 18 includes the method of Example 11, further including adjusting, by bias circuitry, the triggering level of the one or more pixels.

Example 19 is a seeker including: a light sensing apparatus including an arrangement of light sensing pixels, one or more said pixels each associated with a noise floor and able to detect a triggering level of incoming light above the noise floor from a corresponding portion of a scene, the incoming light including visible light, invisible light, or visible and invisible light, readout circuitry to process and reset the triggering pixels, and an automatic gain control (AGC) to artificially raise the noise floor of one or more of the one or more pixels; and control circuitry to dynamically control the AGC to artificially raise the noise floor of the one or more of the one or more pixels by an adjustable amount that varies in relation to the distance between the seeker and an intended target.

Example 20 includes the seeker of Example 19, wherein the control circuitry dynamically controls the AGC in response to a concurrent triggering of two or more said triggering pixels.

Example 21 includes the seeker of Example 19, wherein the control circuitry dynamically controls the AGC in response to a gain schedule corresponding to guiding the seeker to the intended target.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. In addition, various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A light sensing apparatus comprising:
   an arrangement of light sensing pixels, one or more said pixels each associated with a noise floor and able to detect a triggering level of incoming light above the noise floor from a corresponding portion of a scene, the incoming light comprising visible light, invisible light, or visible and invisible light;
   readout circuitry to receive output signals from the triggering pixels and to reset the triggering pixels;
   an automatic gain control (AGC) circuit to raise the noise floor of one or more of the one or more pixels; and
   a bias circuitry to adjust the triggering level of the one or more pixels.

2. The light sensing apparatus of claim 1, wherein the AGC circuit comprises a light emitting device to diffuse additional light to the one or more of the one or more pixels.

3. The light sensing apparatus of claim 2, wherein the light emitting device comprises at least one light emitting diode (LED) and at least one diffuser.

4. The light sensing apparatus of claim 1, wherein the AGC circuit comprises a current injecting control circuit to control injecting of current into an output of a light detecting sensor of each of the one or more of the one or more pixels.

5. The light sensing apparatus of claim 1, wherein each of the one or more pixels further includes a capacitive coupling circuit to average the noise floor over a recent period of time.

6. The light sensing apparatus of claim 1, wherein the arrangement of light sensing pixels is an array of rows and columns, and the readout circuitry comprises row circuitry coupled to the rows and column circuitry coupled to the columns to asynchronously process one or more said triggering pixels each further including request circuitry to notify the row circuitry, the column circuitry, or both the row circuitry and the column circuitry of its triggering.

7. The light sensing apparatus of claim 1, wherein the readout circuitry is further configured to assign a time stamp to each triggering pixel.

8. The light sensing apparatus of claim 1, wherein the AGC circuit is further configured to raise the noise floor of the one or more of the one or more pixels by an adjustable amount.

9. The light sensing apparatus of claim 1, wherein the AGC circuit is further configured to raise the noise floor of the one or more of the one or more pixels in response to a concurrent triggering of two or more said triggering pixels.

10. A method of sensing incoming light by an arrangement of light sensing pixels, one or more said pixels each associated with a noise floor and able to detect a triggering level of the incoming light above the noise floor from a corresponding portion of a scene, the method comprising:
    detecting, by a light detecting sensor of at least one of the one or more pixels, the triggering level of the incoming light above the noise floor from the corresponding portion of the scene, the incoming light comprising visible light, invisible light, or visible and invisible light;
    processing and resetting, by readout circuitry, the at least one triggering pixel;
    artificially raising, by an automatic gain control (AGC), the noise floor of one or more of the one or more pixels; and
    assigning, by the readout circuitry, a time stamp to each triggering pixel.

11. The method of claim 10, wherein artificially raising the noise floor comprises diffusing, by a light emitting device, additional light to the one or more of the one or more pixels.

12. The method of claim 10, wherein artificially raising the noise floor comprises controlling, by a current injecting control circuit, injecting of current into an output of a light detecting sensor of the one or more of the one or more pixels.

13. The method of claim 10, further comprising averaging, by a capacitive coupling circuit of each of the one or more pixels, the noise floor over a recent period of time.

14. The method of claim 10, wherein the arrangement of light sensing pixels is an array of rows and columns, the readout circuitry comprises row circuitry coupled to the rows and column circuitry coupled to the columns, and the method further comprises:
    asynchronously processing, by the readout circuitry, the at least one triggering pixel; and
    notifying, by request circuitry of each triggering pixel, the row circuitry, the column circuitry, or both the row circuitry and the column circuitry of its triggering.

15. The method of claim 10, wherein artificially raising the noise floor comprises artificially raising the noise floor of the one or more of the one or more pixels by an adjustable amount.

16. The method of claim 10, further comprising adjusting, by bias circuitry, the triggering level of the one or more pixels.

17. A seeker comprising:
    a light sensing apparatus including
       an arrangement of light sensing pixels, one or more said pixels each associated with a noise floor and able to detect a triggering level of incoming light above the noise floor from a corresponding portion of a scene, the incoming light comprising visible light, invisible light, or visible and invisible light, readout circuitry to process and reset the triggering pixels, and
       an automatic gain control (AGC) to artificially raise the noise floor of one or more of the one or more pixels; and
    control circuitry to dynamically control the AGC to artificially raise the noise floor of the one or more of the one or more pixels by an adjustable amount that varies in relation to the distance between the seeker and an intended target.

18. The seeker of claim 17, wherein the control circuitry dynamically controls the AGC in response to a concurrent triggering of two or more said triggering pixels.

19. The seeker of claim 17, wherein the control circuitry dynamically controls the AGC in response to a gain schedule corresponding to guiding the seeker to the intended target.

\* \* \* \* \*